(12) United States Patent
Bozchalui

(10) Patent No.: US 11,309,712 B2
(45) Date of Patent: Apr. 19, 2022

(54) METHODS AND APPARATUS INCLUDING AN ENERGY MANAGEMENT SYSTEM

(71) Applicant: Enphase Energy, Inc., Petaluma, CA (US)

(72) Inventor: Mohammad Bozchalui, Fremont, CA (US)

(73) Assignee: Enphase Energy, Inc., Petaluma, CA (US)

(*) Notice: Subject to any disclaimer, the term of this patent is extended or adjusted under 35 U.S.C. 154(b) by 0 days.

(21) Appl. No.: 17/083,061

(22) Filed: Oct. 28, 2020

(65) Prior Publication Data

US 2021/0126466 A1    Apr. 29, 2021

Related U.S. Application Data

(60) Provisional application No. 62/926,959, filed on Oct. 28, 2019.

(51) Int. Cl.
*H02J 3/38* (2006.01)
*H02J 3/28* (2006.01)

(52) U.S. Cl.
CPC ........... *H02J 3/381* (2013.01); *H02J 3/28* (2013.01); *H02J 2203/10* (2020.01); *H02J 2300/24* (2020.01)

(58) Field of Classification Search
CPC .......... H02J 3/381; H02J 3/28; H02J 2203/10; H02J 2300/24; H02J 2310/12; H02J 13/00026; H02J 13/00036; H02J 9/062; H02J 7/35; H02J 13/00004; Y02B 70/30; Y02B 90/20; Y02B 10/70; Y02B 10/10; Y02E 60/00; Y02E 10/56; Y04S 40/126; Y04S 20/12; Y04S 20/248

See application file for complete search history.

(56) References Cited

U.S. PATENT DOCUMENTS

| | | | |
|---|---|---|---|
| 8,836,286 B2 | 9/2014 | Chien et al. | |
| 10,921,014 B1* | 2/2021 | Walsh | H02M 7/06 |
| 2003/0047209 A1* | 3/2003 | Yanai | H02J 3/32 |
| | | | 136/244 |
| 2008/0278983 A1 | 11/2008 | Park | |
| 2009/0027932 A1* | 1/2009 | Haines | H02J 9/062 |
| | | | 363/95 |
| 2009/0079385 A1 | 3/2009 | Roddick et al. | |
| 2009/0115393 A1 | 5/2009 | Ohniwa et al. | |
| 2010/0156185 A1 | 6/2010 | Choe et al. | |

(Continued)

FOREIGN PATENT DOCUMENTS

| | | |
|---|---|---|
| CN | 100589306 C | 2/2010 |
| KR | 20110055389 A | 5/2011 |
| WO | WO-2016064341 A1 | 4/2016 |

OTHER PUBLICATIONS

International Search Report and Written Opinion for application No. PCT/US2020/057759, dated Feb. 10, 2021.

*Primary Examiner* — Daniel Cavallari
*Assistant Examiner* — Brian K Baxter
(74) *Attorney, Agent, or Firm* — Moser Taboada

(57) ABSTRACT

An energy management system is provided and includes a smart switch includes an input that is configured to connect to one of meter at a service entrance or a main load panel; a storage system connected to the smart switch; and a combiner connected to one of the smart switch or the main load panel and one or more photovoltaics (PVs).

22 Claims, 12 Drawing Sheets

(56) References Cited

U.S. PATENT DOCUMENTS

| | | | |
|---|---|---|---|
| 2011/0115295 A1* | 5/2011 | Moon | H02J 3/382 |
| | | | 307/65 |
| 2012/0235480 A1* | 9/2012 | Kim | H02J 9/062 |
| | | | 307/18 |
| 2013/0113281 A1* | 5/2013 | Togashi | H02J 3/383 |
| | | | 307/23 |
| 2014/0008155 A1 | 1/2014 | Rossignol | |
| 2014/0159485 A1* | 6/2014 | Daniel | H02J 13/00034 |
| | | | 307/24 |
| 2015/0030061 A1* | 1/2015 | de Ruijter | G06F 13/4295 |
| | | | 375/226 |
| 2015/0195099 A1* | 7/2015 | Imes | H04L 12/2803 |
| | | | 700/275 |
| 2016/0036235 A1* | 2/2016 | Getsla | H02J 3/383 |
| | | | 307/80 |
| 2016/0048194 A1 | 2/2016 | Lee et al. | |
| 2016/0099565 A1* | 4/2016 | Tseng | H02J 13/00009 |
| | | | 307/24 |
| 2017/0040798 A1* | 2/2017 | Mazuelas | H02J 3/00 |
| 2017/0288599 A1 | 10/2017 | Chapman et al. | |
| 2017/0372438 A1* | 12/2017 | Peloso | G05B 19/042 |
| 2018/0048159 A1* | 2/2018 | Narla | H01L 31/042 |
| 2018/0054064 A1* | 2/2018 | Narla | H02J 3/381 |
| 2018/0331242 A1* | 11/2018 | Grimmett | H02S 40/32 |
| 2019/0181690 A1* | 6/2019 | Haartsen | H02J 13/0075 |

* cited by examiner

METHODS AND APPARATUS INCLUDING AN ENERGY MANAGEMENT SYSTEM

CROSS-REFERENCE TO RELATED APPLICATIONS

This application claims priority to and the benefit of U.S. Provisional Patent Application Ser. No. 62/926,959, which was filed on Oct. 28, 2019, the entire contents of which is incorporated herein by reference.

BACKGROUND

1. Field of the Disclosure

Embodiments of the present disclosure generally relate to power systems and, more particularly, to methods and apparatus including an energy management system that manages a multitude of energy resources including, but not limited to, solar, storage, load, grid, and/or a generator.

2. Description of the Related Art

A grid-tied solar PV system is a solar energy system that is connected (or tied) to a utility electrical grid and only operates if the grid is available. During a power outage, the grid-tied PV system stops generating power, and remains shut down until the grid power become available.

SUMMARY

In accordance with at least some embodiments, an energy management system is provided and includes a smart switch includes an input that is configured to connect to one of meter at a service entrance or a main load panel; a storage system connected to the smart switch; and a combiner connected to one of the smart switch or the main load panel and one or more photovoltaics (PVs).

In accordance with at least some embodiments, an energy management system is provided and includes a smart switch including an input that is configured to connect to one of meter at a service entrance or a main load panel, wherein the smart switch is configured to support one of whole home backup, partial home backup, and subpanel backup; a storage system connected to the smart switch, wherein the storage system comprises one of a three-phase AC-coupled battery or a single-phase AC-coupled battery that are connected to the smart switch; and a combiner connected to one of the smart switch or the main load panel and one or more photovoltaics (PVs).

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only a typical embodiment of this disclosure and are therefore not to be considered limiting of its scope, for the disclosure may admit to other equally effective embodiments.

DETAILED DESCRIPTION

Figure 1:
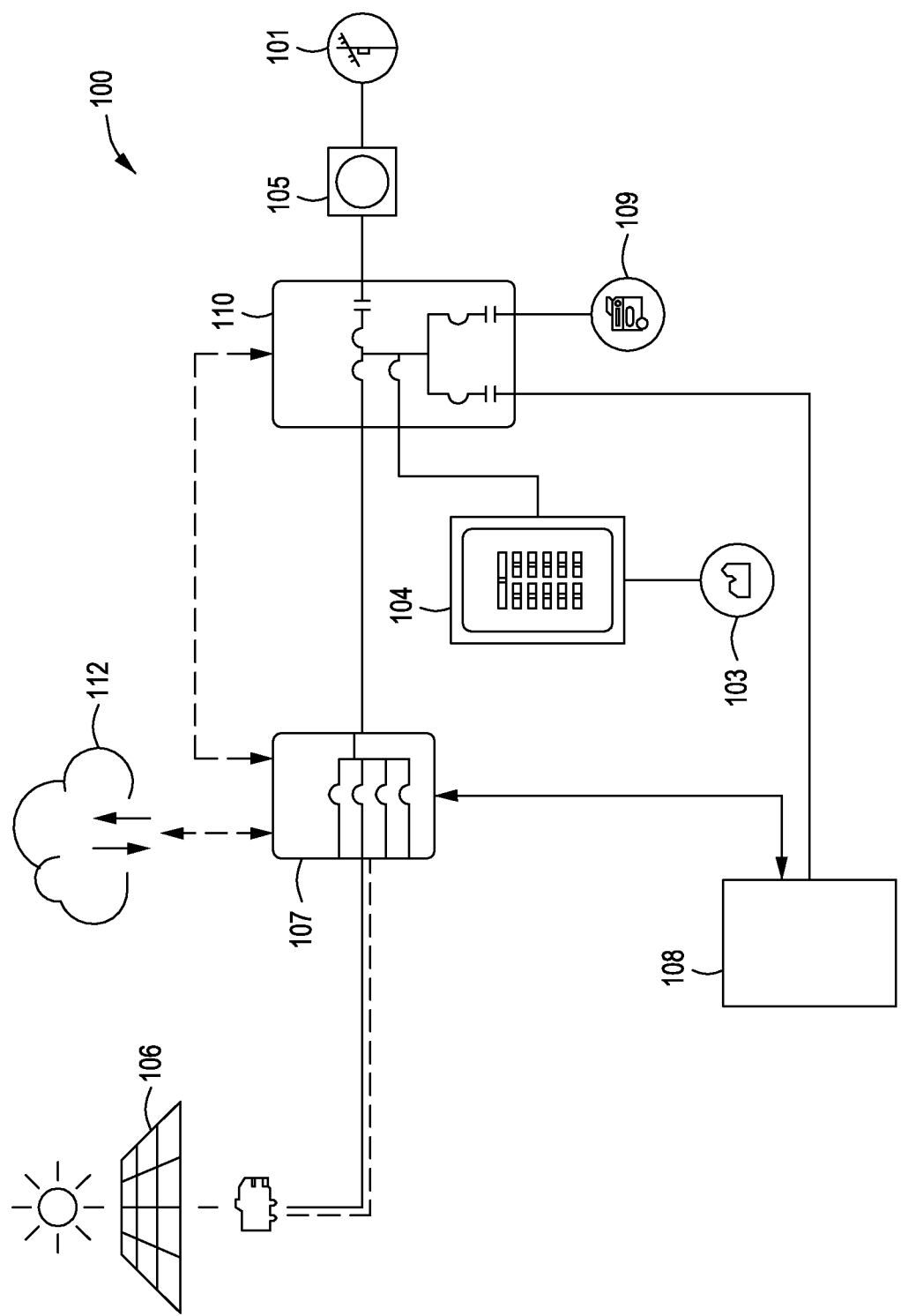
FIG. 1 is a diagram of a backup configuration supported by an energy management system, in accordance with at least some embodiments of the present disclosure.

Methods and apparatus described herein provide an energy management system (technology) that manages a multitude of energy resources—including solar, storage system, load, grid, or a generator. The energy management system described herein can seamlessly manage an energy environment including one or more of the resources. Additionally, the energy management system is configured to prevent an island of energy that may continue to feed power to a utility grid during an outage, which can potentially injure a worker/technician trying to restore service to the grid, known as "anti-islanding."

The energy management system described herein is compatible with one or more microinverters (such as the IQ® series line of PV microinverters available from Enphase Energy, Inc., from Petaluma, Calif.), both for existing (e.g., retrofit) and new installs, and can be connected to or include a storage system, power supply, and a wireless communication kit, thus making a user's home grid independent.

The energy management system enables a user to backup a home entirely or partially, up to a rated energy capacity of 40 kWh and more than 15 kW power rating, providing maximum flexibility to a user.

The energy management system described herein can be configured for use with an IQ series and can be adapted for use with backward compatibility with M- or S-Series microinverter systems.

A smart switch provides microgrid interconnect device (MID) functionality that allows a home to be isolated from the utility grid, thus enabling grid-independence. The smart switch also provides connections for easier integration of battery storage, PV, and generator integration into a home energy system, and can be configured for managing load imbalance in a home.

A microgrid system can be defined as a premises wiring system that has generation, energy storage, and load(s), or any combination thereof, that includes the ability to disconnect from and parallel with a primary source. Such systems have also been referred to as "intentionally islanded systems."

In accordance with the instant disclosure, MID devices can comply with the following: (1) be required for any connection between a microgrid system and a primary power source; (2) be listed or field labelled for an application; and (3) have sufficient number of overcurrent devices located to provide overcurrent protection from all sources.

In at least some embodiments, multiple smart switches can be configured to back up separate 200 A load panels. In such embodiments, each smart switch also can include a communication gateway and can be set up as independent systems in backup operation. Each smart switch can form a separate island with associated load panel during backup operation, e.g., each island is configured to show up as two separate systems. In at least some embodiments, the islands do not be connected to each other during backup operation, and the loads, energy storage, and PVs that are within each island can be separated from the rest of the system via each smart switch.

In the unlikely event of failure of a smart switch, a solar system can fall back to grid-tied mode. The energy management system remote troubleshooting capabilities can be configured to identify and fix such an occurrence when the energy management system is connected to application software, e.g., cloud-based tertiary control using application programming interface (API).

The storage system and smart switch communicates with a gateway over one or more suitable wireless interfaces (e.g., with IEEE 802.15.4 specification, to create personal area networks that require a low data transfer rate, energy efficiency and secure networking). For this purpose, a wireless adapter (USB dongle) is provided and is configured to connect to a USB port of the gateway (e.g., present inside a combiner box). As a failsafe mechanism, the wireless adaptor is configured to operate in two frequency bands: 2.4 GHz and 915 MHz. The former frequency band is the primary band of communication, and if the primary communication fails, the energy management system establishes the communication with the latter.

The energy management system components are configured to use standard encrypted messaging and authentication to communicate with one another, and with the cloud.

In at least some embodiments, per-panel, per microinverter, and per battery storage base unit monitoring feature is available in the energy management system. Moreover, in at least some embodiments, real-time monitoring feature is available in the energy management system.

FIG. 1 is a diagram of a backup configuration supported by the energy management system 100, in accordance with at least some embodiments of the present disclosure. In at least some embodiments, the energy management system 100 comprises a storage system 108, a smart switch 110, a combiner 107 including a wireless adaptor, which can be a USB dongle that connects to a communication gateway, one or more PVs 106, and a tertiary control 112 (e.g., cloud-based tertiary control using application programming interface (API)), which can provide over-the-air firmware upgrade.

The combiner 107 can connect/communicate with the smart switch 110 and the storage system 108 via a wireless connection (or wired connection, such as an AC power wire) and with the Internet and/or cloud via WiFi or cellular connections. For example, the combiner 107 comprises the communication gateway (FIG. 11) to which the wireless adaptor connects and communicates with the smart switch 110, the storage system 108, the Internet and/or cloud. The combiner 107 connects to one or more PVs 106 and can communicate with the PVs 106 via a power line communication (PLC) over an AC power wire, and the other components of the energy management system 100 can connect to each other via the AC power wire. A combiner that is suitable for use with the energy management system 100 is the IQ® line of combiners available from Enphase Energy, Inc., from Petaluma, Calif.

The energy management system 100 of FIG. 1 is configured as a whole home backup (or partial home backup and subpanel backup) with the smart switch 110 (e.g., transfer switch) of the energy management system 100 located at a service entrance (e.g., connected to a meter 105 which is connected to a utility grid 101). A user can back up an entire main load panel 104 (e.g., Siemens MC3010B1200SECW or MC1224B1125SEC, GE 200 Amp 20/40, and the like), which connects to one or more loads 103 (e.g., critical or backup loads). In such a configuration, the smart switch 110 can support up to an 80 A breaker for a PV 106 circuit connected to THE combiner 107 (e.g., PV combiner, (solar)) and an 80 A breaker for a battery storage circuit (e.g., for the storage system 108).

Figure 2:
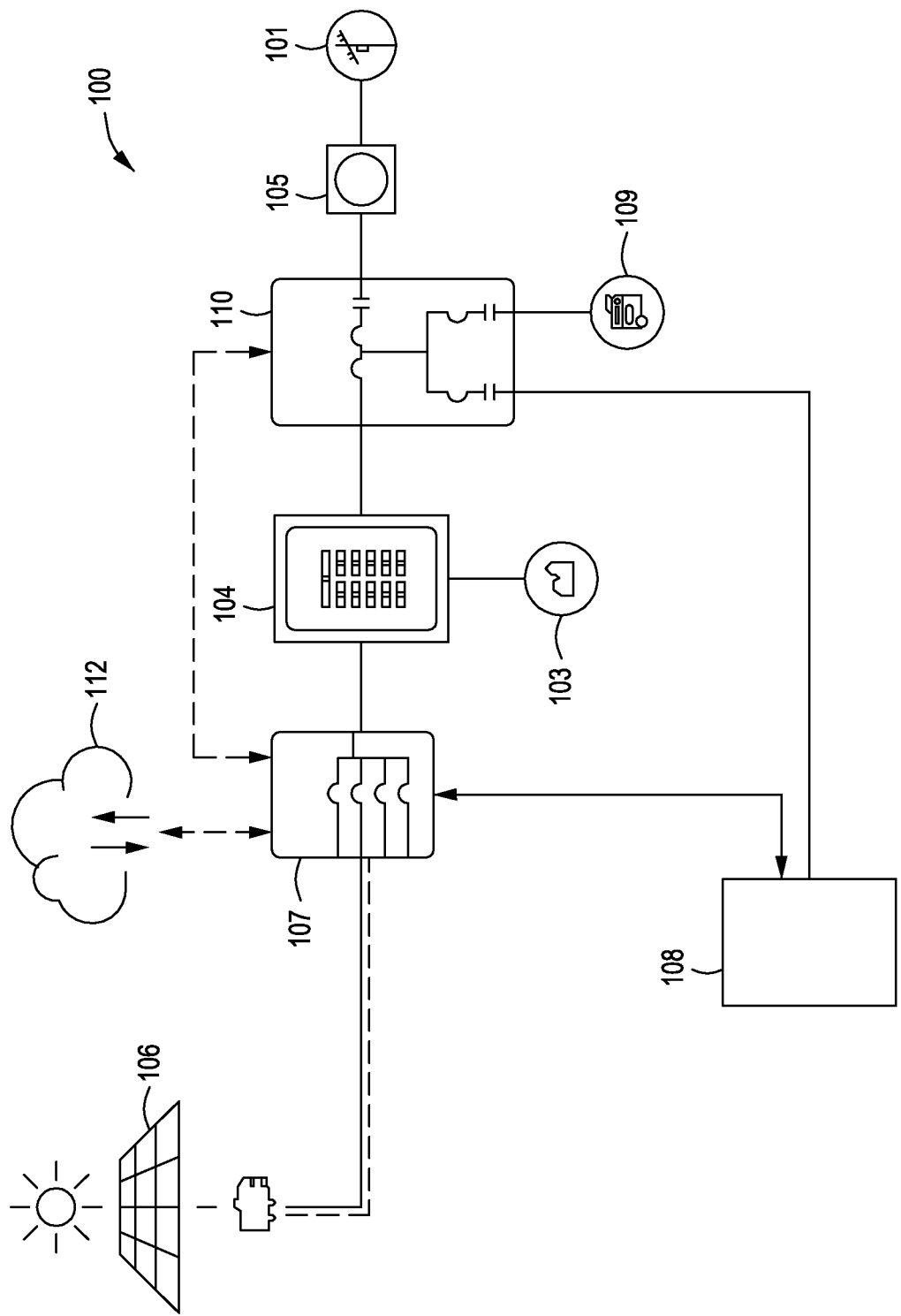
FIG. 2 is a diagram of a backup configuration supported by an energy management system, in accordance with at least some embodiments of the present disclosure.

When existing combiner 107 circuits are connected to the main load panel 104 (FIG. 2), a user can keep the combiner 107 connected to the main load panel 104, connect only the storage system 108 to the smart switch 110, and the space in the smart switch 110 for the combiner 107 can be left vacant and used for additional battery storage.

The smart switch 110 is configured to consolidate interconnection equipment into a single enclosure and streamline grid-independent capabilities of PVs and battery storage installations by providing a consistent, pre-wired solution for a user (e.g., residential users). Along with the smart switch 110 functions, the smart switch 110 also includes PV 106, storage system 108, and generator 109 input circuits. The smart switch 110 includes an input that is configured to connect to one of the meter 105 at a service entrance or the main load panel 104.

A smart switch that is suitable for use with energy management system 100 can be the ENPOWER® line of smart switches available from Enphase Energy, Inc., from Petaluma, Calif. The smart switch 110 can be installed using a wall-mount bracket and can be installed complying with national and local electrical codes and standards, as described in greater detail below.

Figure 3:
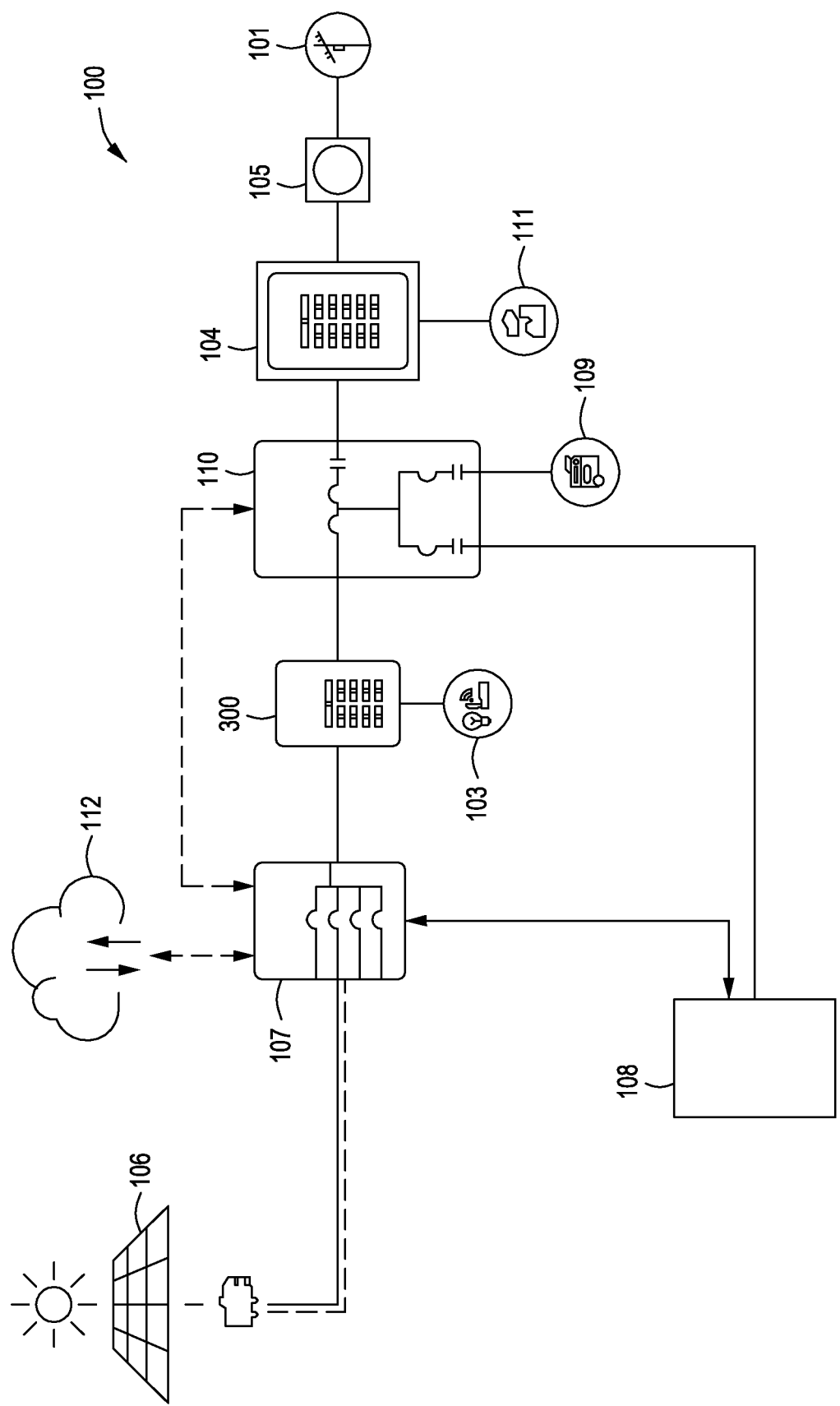
FIG. 3 is a diagram of a backup configuration supported by the energy management system, in accordance with at least some embodiments of the present disclosure.

FIG. 3 is a diagram of backup configurations supported by the energy management system 100, in accordance with at least some embodiments of the present disclosure. The energy management system 100 can be configured for partial home back up using a subpanel 300 backup for the loads 103 (e.g., critical or backup loads) with the main load panel 104, which is connected to other loads 111 (e.g., non-critical/non-essential loads), at the service entrance and the combiner 107 connected to the sub-panel 300, e.g., when the PV 106 circuit is more than 80 A. The space available in the smart switch 110 of the energy management system 100 for the combiner 106 connection can be left vacant.

Figure 4:
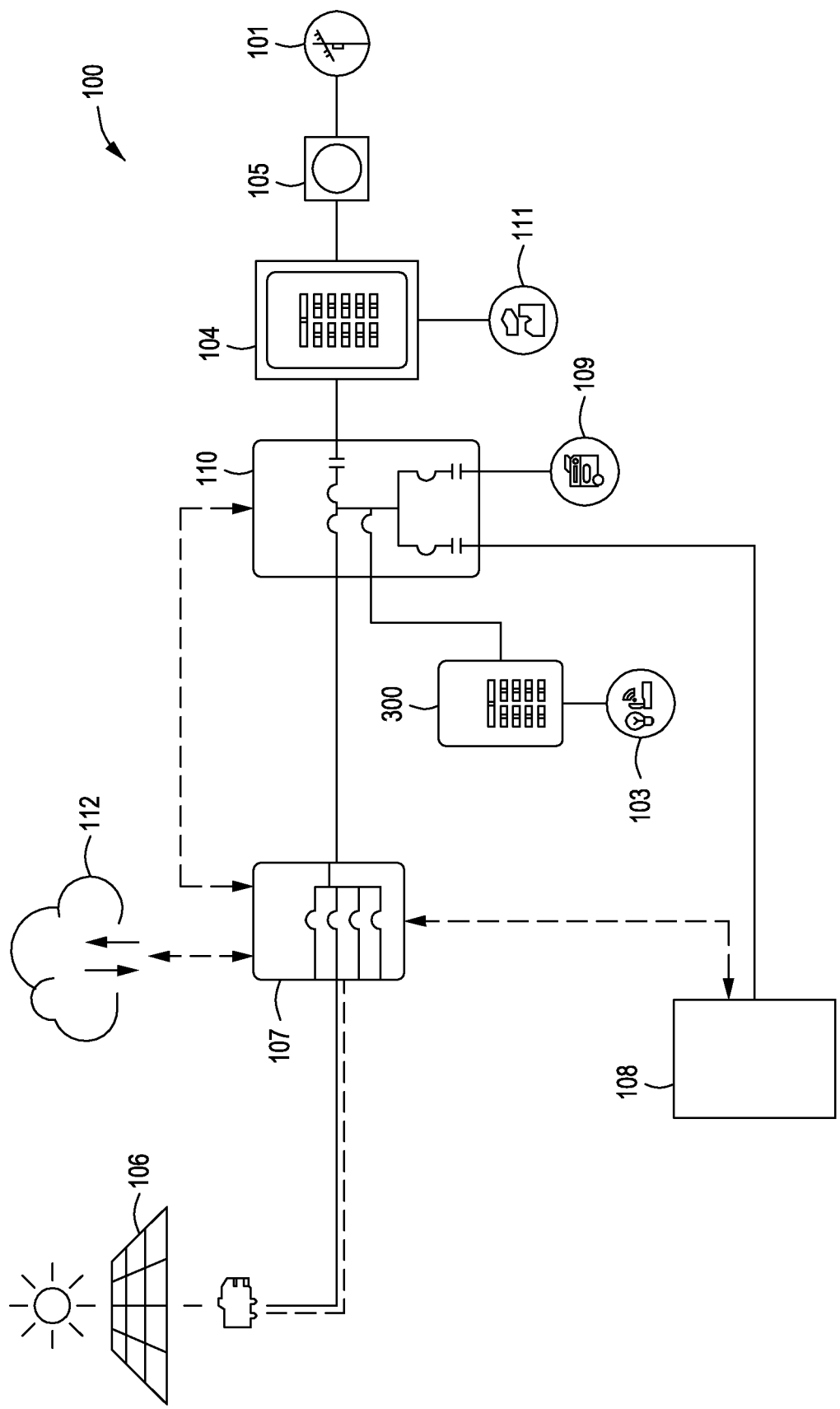
FIG. 4 is a diagram of a backup configuration supported by an energy management system, in accordance with at least some embodiments of the present disclosure.

FIG. 4 is a diagram of backup configurations supported by the energy management system 100, in accordance with at least some embodiments of the present disclosure. The energy management system 100 can be configured for partial home back up using the subpanel 300 (e.g., critical loads) backup with the main load panel 104 at a service entrance and the combiner 107 connected to the smart switch 110 of the energy management system 100, e.g., when the PV 106 circuit and storage system 108 are less than 80 A.

In accordance with at least some embodiments, when the energy management system 100 is configured for whole backup, as the PV 106 and storage system 108 are connected to the smart switch 110 on a utility side of the main load panel 104, a main load panel 104 upgrade is not required, and the main load panel 104 is protected by the main load panel 104 main breaker that was protecting the main load panel 104 prior to connecting the PV 106 and storage system 108, e.g., no violation of 120% rule. Similarly, when the energy management system 100 is configured for partial backup, by downsizing the utility breaker in the main load panel 104, main load panel upgrade can also be avoided. For example, for a 200 A main load panel, by downsizing the 200 A breaker to 150 A, 90 A of PV 106 and storage system 108 capacity is available without a main load panel upgrade. In addition, as the energy management system 100 complies with UL certificate requirement decision (CRD) 1741 for power control systems, main load panel upgrades can also be avoided.

Figure 5:
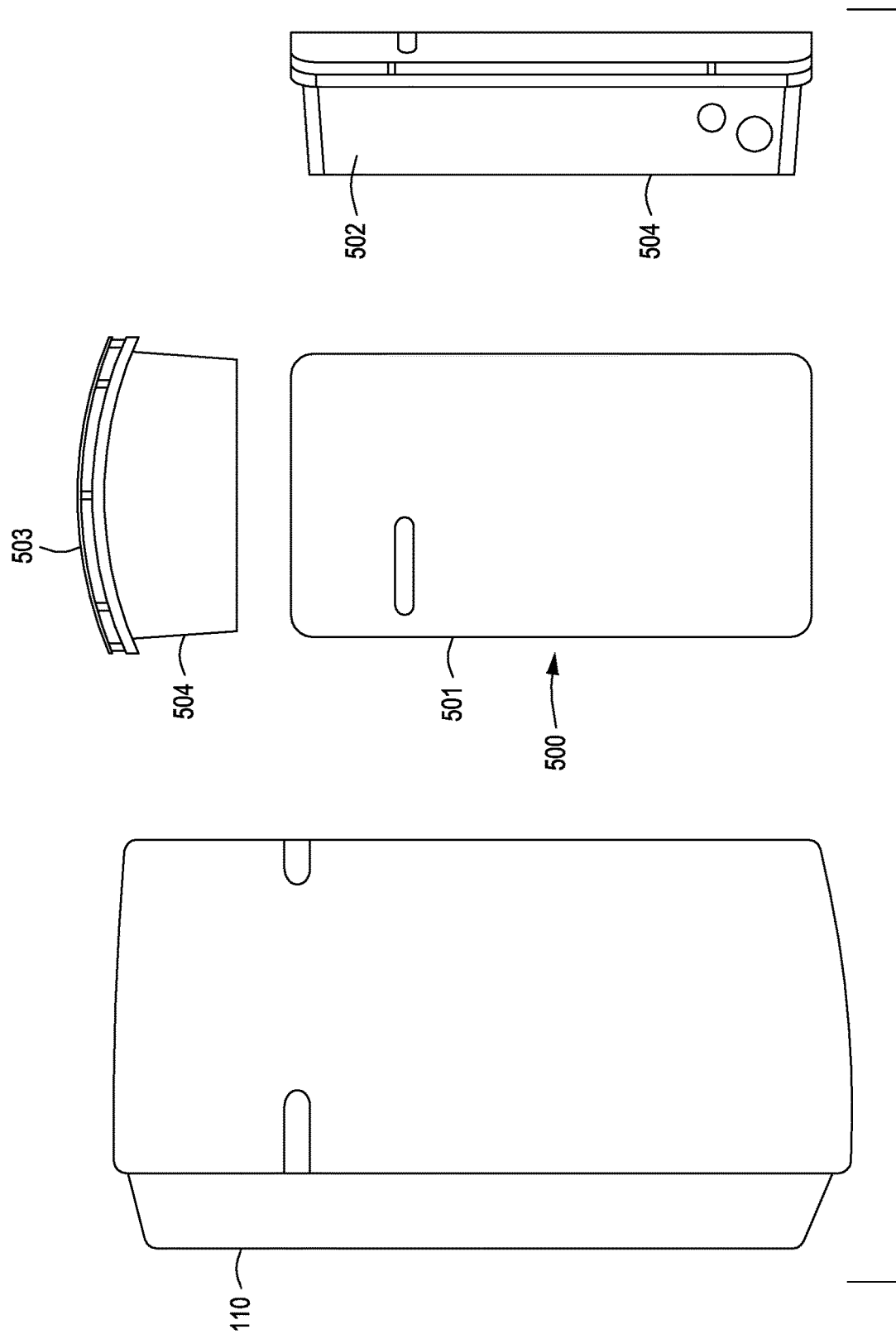
FIG. 5 is a diagram of the smart switch of the energy management system, in accordance with at least some embodiments of the present disclosure.

FIG. 5 includes diagrams of various views of the smart switch 110, in accordance with at least some embodiments of the present disclosure. The smart switch 110 includes a reliable, durable NEMA type 3R enclosure and is configured to provide safe control connectivity to the grid 101, automatically detect grid 101 outages, and provide seamless transition to backup. The smart switch 110 can connect to the one or more loads 103 or service entrance side of the main load panel 104 (FIG. 1), include centered mounting brackets to support mounting to one or more mounting surfaces, support conduit entry from the bottom, bottom left side, and/or bottom right side, support whole home, partial home backup, and subpanel backup, can provide up to 200 A main breaker support, and include a neutral-forming transformer for split phase 120/240V backup operation. The smart switch 110 streamlines grid-independent capabilities of PV 106 and storage system 108 installations. The smart switch 110 can comprise a housing 500 with a front cover 501 having a width of about 19.7 inches and a height of about 36 inches. The smart switch 110 can include a main enclosure 502 having a width of about 18.8 inches, a height of about 33.8 inches, a depth of about 7.2 inches, and a distance between a back surface 504 of the enclosure 502 to a front surface 503 of the front cover 501 is about 9.7 inches.

As noted above, the smart switch 110 is a MID (e.g., as per NEC 705). The smart switch 110 can be configured for 100 A, 150 A, or 200 A disconnecting current capacity for backup. The smart switch 110 can provide seamless transition to backup during utility grid outages, include an auto transformer to support 120V/240V loads in backup, support interconnection of the single-phase AC-coupled battery, the three-phase AC-coupled battery, the combiner 107, backup load panel, support whole home and subpanel backup, include a NEMA-3R enclosure for indoor and outdoor Installations, can support 2.4 GHz and 900 MHz wireless communication, and support generator integration.

Figure 6:
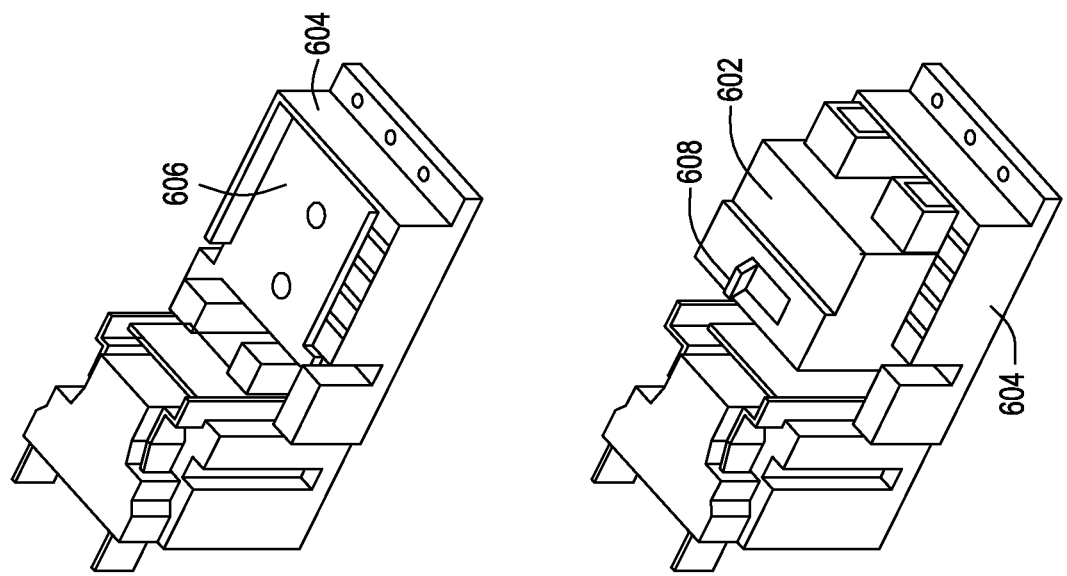
FIG. 6 includes diagrams of a circuit breaker installation, lugs at a main breaker position, and a breaker installed at a main breaker position for the smart switch, in accordance with at least some embodiments of the present disclosure.
Figure 6:
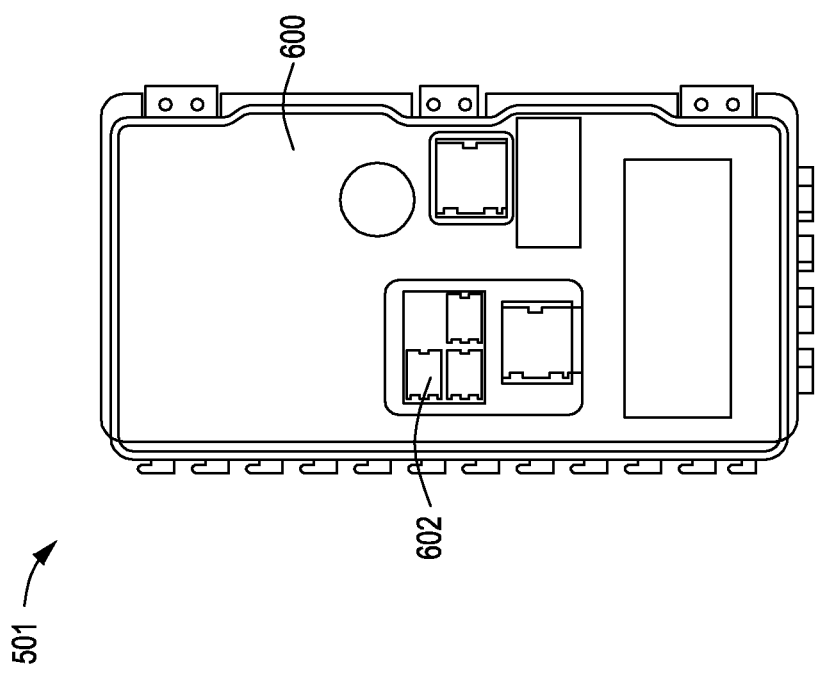

FIG. 6 includes diagrams of a circuit breaker installation, lugs at a main breaker position, and a breaker installed at a main breaker position for the smart switch 110, in accordance with at least some embodiments of the present disclosure. The smart switch 110 includes a back surface 600 that is configured to support the electrical components of the smart switch 110 and to expose a main breaker 602 (e.g., 200 A). The main breaker 602 is connected to a main lug housing 604 that includes a connection area 606 to which the main breaker 602 is connected to. The main lug housing 604 is supported on the back surface 600. The main breaker 602 includes a switch 608 and two electrical connection areas 610 that are configured to receive corresponding wires (not shown).

Figure 7C:
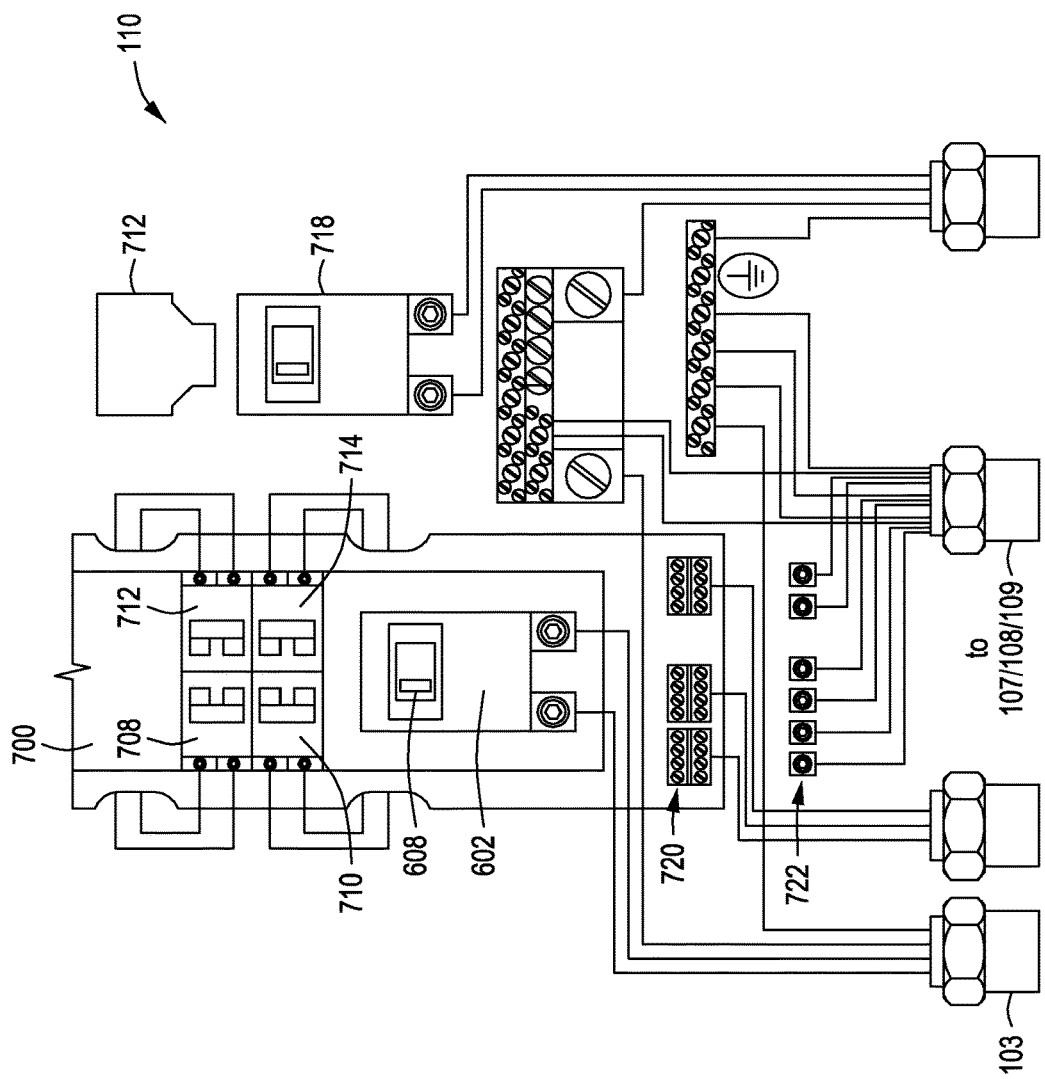
FIGS. 7A-7D are diagrams of wire field connections for the energy management system, in accordance with at least some embodiments of the present disclosure.
Figure 7A:
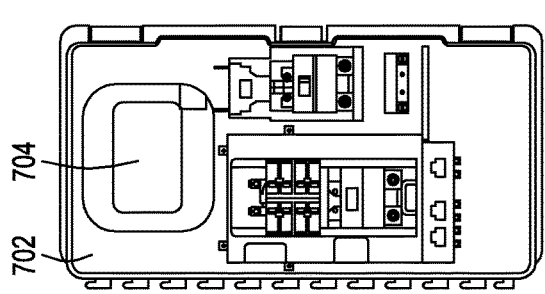
Figure 7B:
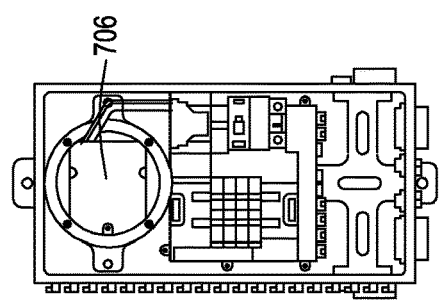
Figure 7D:
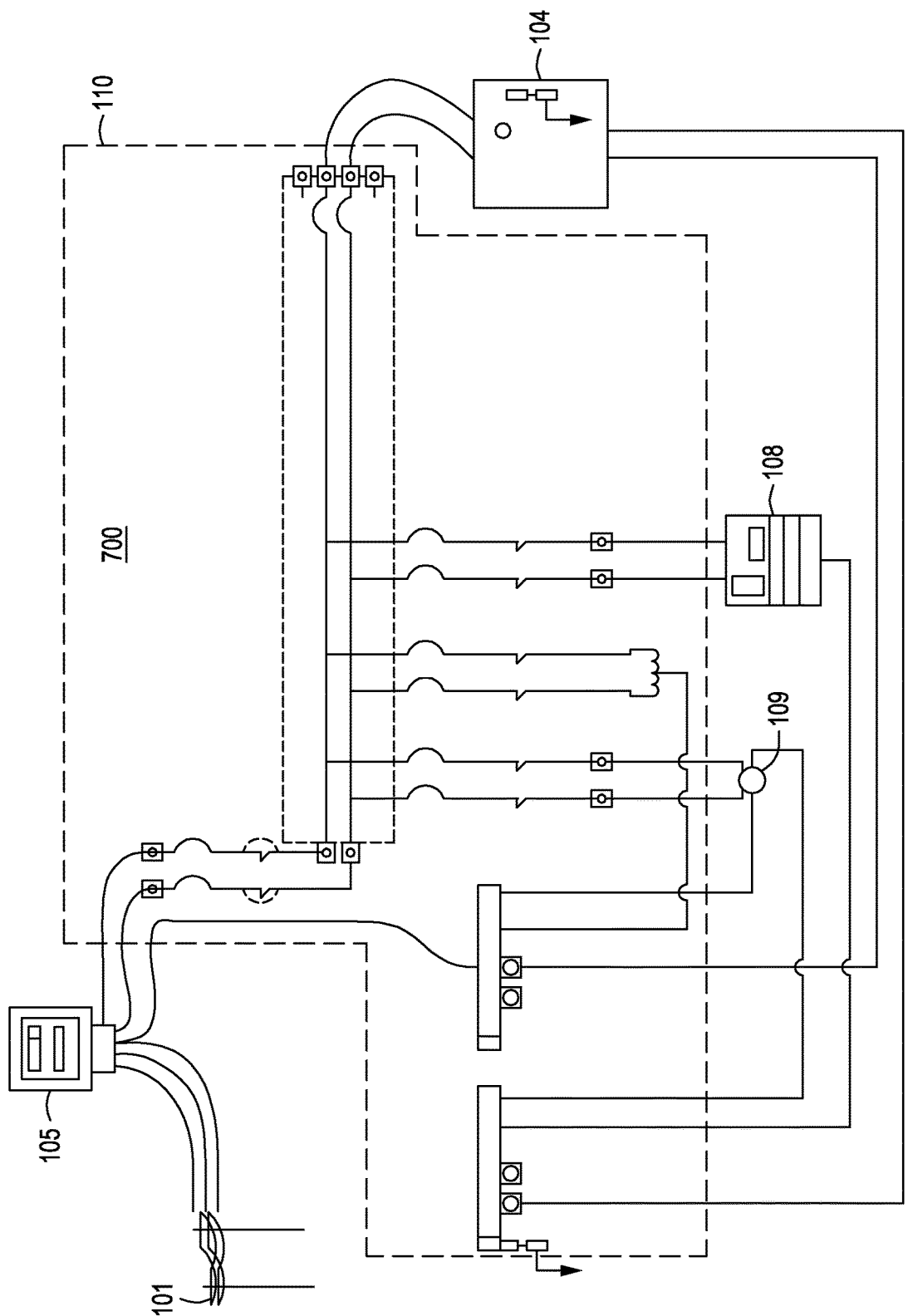

FIGS. 7A-7D are diagrams of an electrical panel 700 including electrical details of the smart switch 110, in accordance with at least some embodiments of the present disclosure. FIG. 7A illustrates a back cover 702 that partially covers the electrical panel 700 of the smart switch 110. The back cover 702 includes a door 704 that covers the control PCBA 706 (FIG. 7B) and autotransformer (not shown). The back cover 702 includes an opening through which one or more breakers, eaton breakers, relays, MID relays, connectors, bus bars, and other electrical components of the electrical panel 700 extend (FIG. 7A). For example, the electrical panel 700 can include an AC combiner breaker 708, a battery storage system breaker 710, an auto transformer breaker 712, a generator breaker 714, the main load breaker 602, a main relay, 716 (e.g., 200 A), a main breaker 718 for service disconnect, I/O connectors 720, and one or more connectors 722 for the combiner 107, storage system 108, and the generator 109 (FIGS. 7A and 7C). The wiring from the electrical panel 700 can be fed from the smart switch 110 to the various components of the energy management system 100 (e.g., the combiner 107, the storage system 108, generator 109, etc.) or components connected to the energy management system 100, e.g., the main load panel 104, (FIG. 7D).

Figure 9:
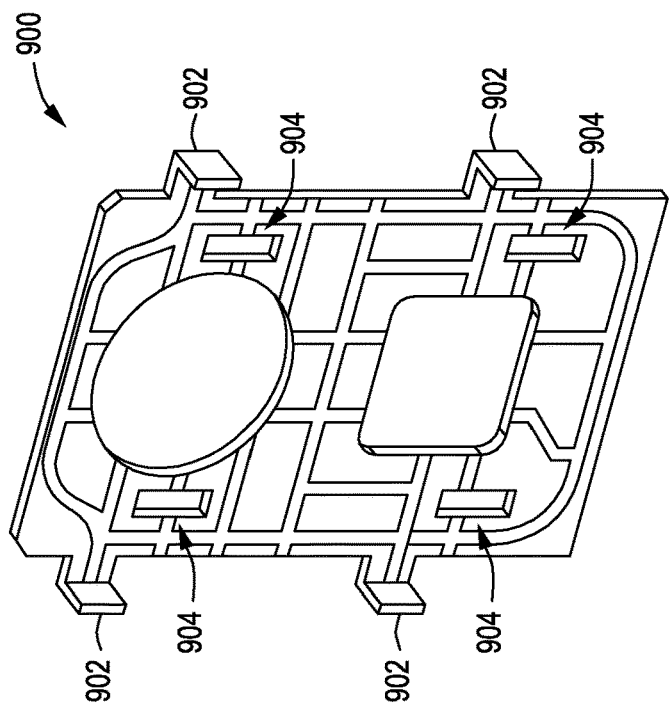
FIG. 9 is a diagram of a smart switch bracket for use with the wall mount of FIG. 8, in accordance with at least some embodiments of the present disclosure.
Figure 10:
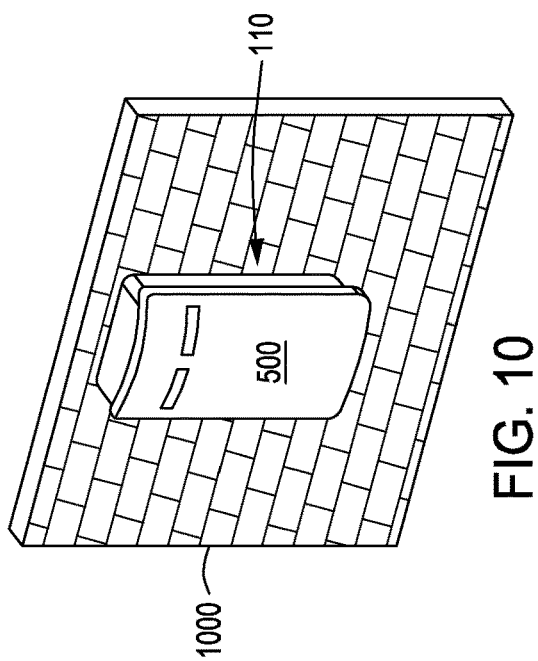
FIG. 10 is a diagram of the smart switch shown mounted on a mounting surface using the wall mount and smart switch bracket, in accordance with at least some embodiments of the present disclosure.
Figure 8:
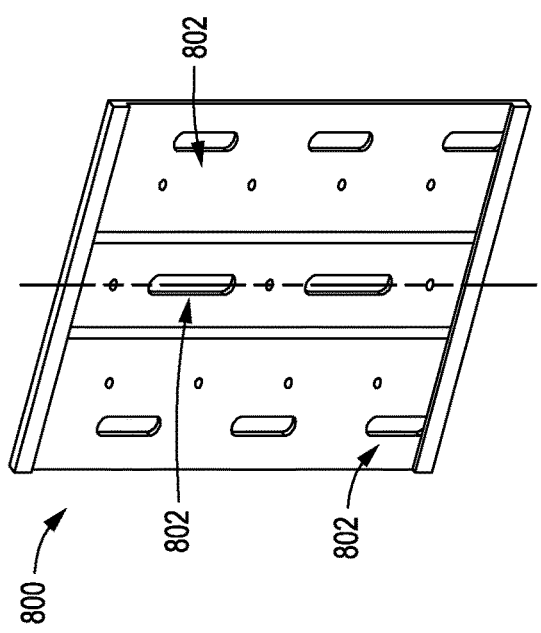
FIG. 8 is a diagram of a wall mount used for mounting the smart switch of FIG. 5, in accordance with at least some embodiments of the present disclosure.

FIG. 8 is a diagram of a wall mount 800 used for mounting the smart switch 110 of the energy management system 100, FIG. 9 is a diagram of a bracket 900 of the smart switch 110, and FIG. 10 is a diagram of the smart switch 110 shown mounted on a mounting surface 1000, in accordance with at least some embodiments of the present disclosure. The wall mount 800 includes a plurality of apertures 802. The apertures 802 are configured to receive one or more fasteners therethrough for mounting the wall mount 800 to the mounting surface 1000. The bracket 900 is configured to connect to a back of the smart switch 110 and to the wall mount 800. For example, in at least some embodiments, the bracket 800 includes a plurality of generally L-shaped locking tabs 902 that are configured to engage a side surface of the smart switch 110. During installation, a user aligns a plurality of apertures 904 of the bracket 900 with the plurality of apertures 802 of the wall mount 800 and drives the one or more fasteners (e.g., bolts, screws, etc., not shown) through the apertures 802, 904 and into the mounting surface 1000, e.g., single stud, wood, brick, or concrete wall, and the like. Next, a user can attach/connect the smart switch 110 to the bracket 900 by pressing the smart switch 110 into the bracket 900 until the locking tabs 902 engage the side surface of the housing 500 of the smart switch 110.

Figure 11:
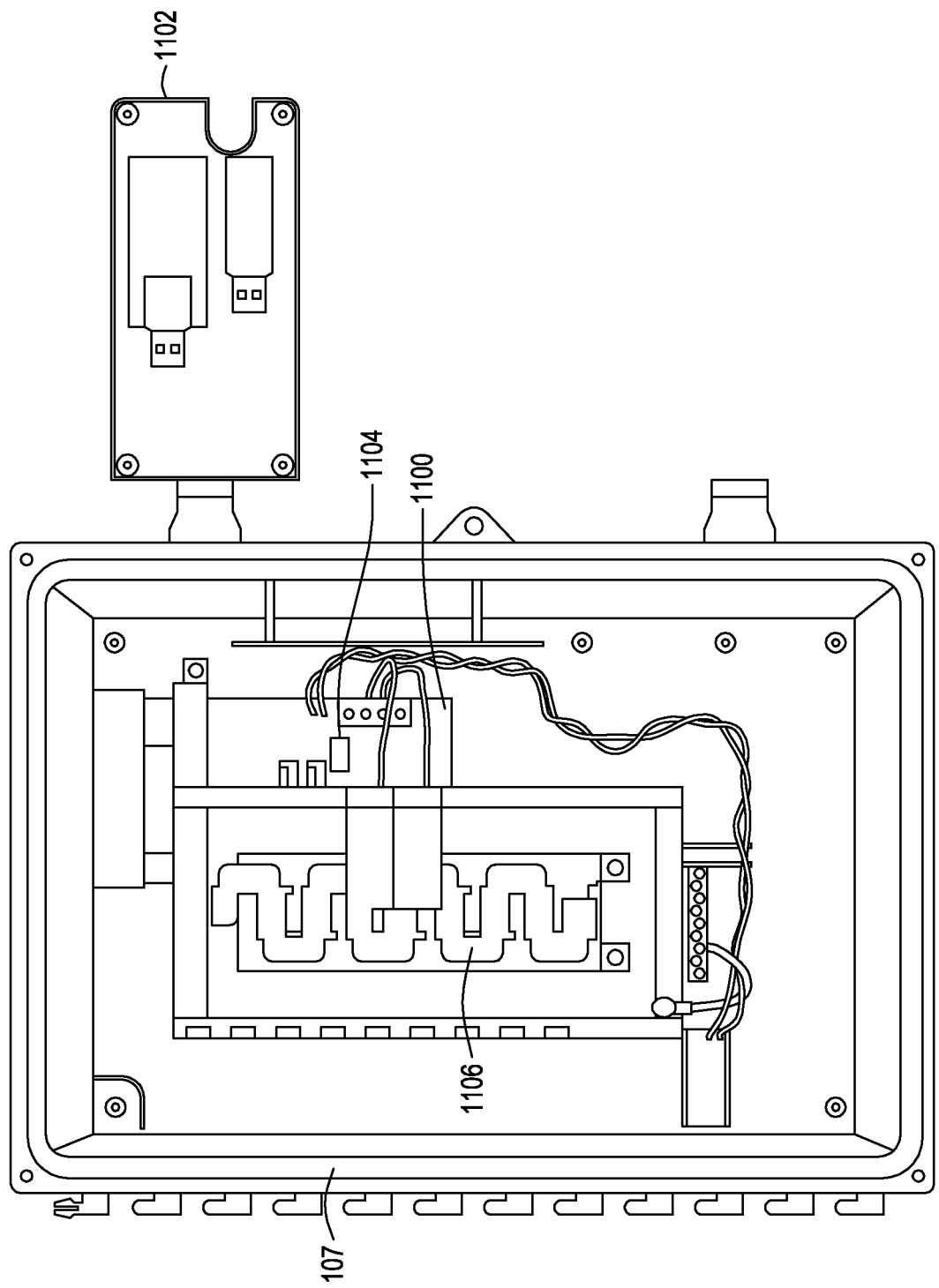
FIG. 11 is a diagram of a housing used to house a combiner with a gateway and wireless kit, in accordance with at least some embodiments of the present disclosure

FIG. 11 is a diagram of the combiner 107 with the gateway 1100 and wireless communication kit 1102 (e.g., such as the ENSEMBLE® line of communication kits available from Enphase Energy, Inc., from Petaluma, Calif.), in accordance with at least some embodiments of the present disclosure. The gateway 1100 further comprises a gateway controller 1104 that is coupled to a bus 1106 via a breaker 1108 and communicates with, for example, power conditioners (e.g., via PLC and/or other types of wired and/or wireless techniques). The gateway controller 1104 comprises a transceiver, support circuits, and a memory, each coupled to a CPU (not shown). The CPU may comprise one or more conventionally available microprocessors or microcontrollers. Alternatively, the CPU may include one or more application specific integrated circuits (ASICs). The gateway controller 1104 may send command and control signals to the storage system 108, the smart switch 110, the PVs 106, and one or more of the power conditioners and/or receive data (e.g., status information, performance data, and the like) from the storage system 108, the smart switch 110, the PVs 106, and one or more of the power conditioners. In some embodiments, the gateway controller 1104 may be a gateway that is further coupled, by wireless and/or wired techniques, to a master controller (e.g., the tertiary control 112) via a communication network (e.g., the Internet) for communicating data to/receiving data from the master controller (e.g., performance information, firmware updates, and the like).

The combiner 107 with gateway 1110 and wireless kit 1102 (e.g., a USB dongle) is configured to support up to 4 circuits—solar and storage, uses eaton busbar and requires BR breakers, solar distribution breakers can be added separately, includes 10 A gateway breaker, includes a gateway control and communication a gateway, is configured for single stud mounting, which simplifies installation, accepts conduit entry along sides, bottom, and/or back of enclosure, and is configured for wireless communication kit, e.g., with 2.4 GHz and 900 MHz.

Homes are, typically, built with the main load panel sized for connection to a specific amount of resource loads and utility connection. This specific amount is determined by section 705 of the National Electric Code (NEC) that prevents installation of resources beyond the capabilities of the main panel in every installation. Adding new PV or battery storage to an existing home can lead to a situation where a total amount of resources connected to the main load panel exceeds the limitation of the main load panel. Traditionally, there were two ways to deal with this limitation of the main load panels: (1) only install PV and battery storage up to the maximum limit of the load main panel, which can be very restrictive; and (2) upgrade the main load panel to a larger sized panel that can accept more PV and battery storage, which can lead to additional expenditure.

Accordingly, the energy management system 100 provides an innovative solution to the main load panel upgrade by connecting the additional PV and battery storage to the smart switch 110 instead of to the main load panel, thus avoiding the main load panel upgrade for whole home and subpanel backup systems. In the case of whole home backup, the smart switch 110 is connected between the meter 105 and the main load panel 104 with an over current protection device that limits the amount of current that flows to the main load panel, thus avoiding the main load panel upgrade. For the subpanel 300 backup, a user can move as much load circuits from the main load panel 104 to the sub-panel 300 until the requirements of 705.12(D)(2)(3)(c) are met.

In instances when a power supply is used in grid-tied mode, e.g., for self-consumption, time of use optimization without backup, the smart switch 110 may not be needed.

The load 103 circuits that will be backed up during grid outages can be pre-selected during installation of the energy management system 100. If users choose to have subpanel 300 backup, the user can select which circuits they want to backup during installation of the energy management system 100. In this case, only selected load 103 circuits will be backed-up and other non-critical/non-essential loads 111 will not be powered-on during outages. In such an instance, there is no need to manually open the breakers of the main load panel if a user selects the subpanel 300 backup option.

If the user chooses whole home backup option, then all the load 103 circuits of the house will be backed-up. If the user wishes to restrict backed-up load 103 circuits during outages, the user may need to not use those specific loads or open the breakers of the specific load 103 circuits manually.

When the energy management system 100 is configured as a backup system, disconnecting the smart switch 110 of energy management system 100 from the grid 101 will not turn off the power to the house, e.g., since the energy management system 100 provides power to the house during an outage. The single phase AC-coupled battery and three-phase AC-coupled battery are the grid-forming element of the energy management system 100, and they will need to be isolated from the energy management system 100 or shut down to de-energize the premise.

All the breakers inside the smart switch 110 will need to be opened to de-energize the energy management system 100. By opening the main breaker 602 inside the smart switch 110, the energy management system 100 will shut down.

Some AHJs (authorities having jurisdiction) expect additional mechanical disconnect. Accordingly, installers need to understand the specific local regulation requirements for installation of PVs and the battery storage systems and design the energy management system 100 to fully comply with them.

In at least some embodiments, as noted above, the energy management system 100 can be configured for 3-phase applications.

In at least some embodiments, a generator (e.g., the generator 109) including hardware and software capability can be integrated into the energy management system 100.

Figure 12:
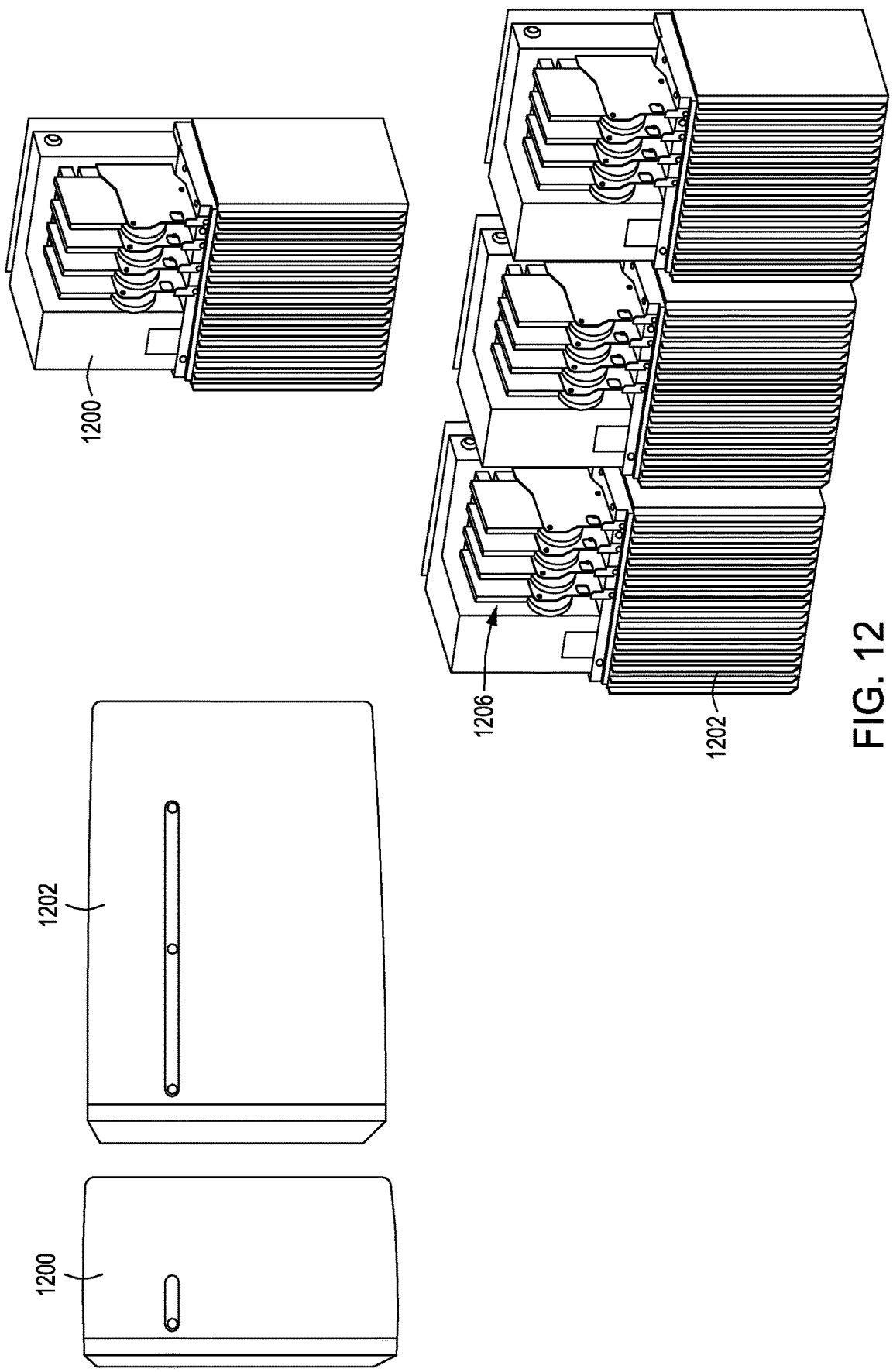
FIG. 12 is a diagram of two types of AC battery with a backside of the single-phase AC battery and the three phase AC battery, respectively, being shown on top and bottom, in accordance with at least some embodiments of the present disclosure.

FIG. 12 is a diagram of a single-phase AC-coupled battery 1200 and a three-phase AC-coupled battery 1202, in accordance with at least some embodiments of the present disclosure. The single-phase AC-coupled battery 1200 and a three-phase AC-coupled battery 1202 can be part of the storage system 108.

The storage system 108 can be a modular AC-coupled battery storage system with time-of-use and backup capability. One type of storage system that is suitable for use with the energy management system 100 is the ENCHARGE 3® and ENCHARGE 10® line of storage system available from Enphase Energy, Inc., from Petaluma, Calif. The storage system can include the single-phase AC-coupled battery 1200 (e.g., 3.36 kWh capacity and 1.28 kVA rated continuous output power) or the three-phase AC-coupled battery 1202 (e.g., 10.08 kWh and 3.84 kVA rated continuous output power). Internally, the three-phase AC-coupled battery 1202 has three single phase AC-coupled battery 1200 base units. In at least some embodiments, the modularity allows a user to install as many of single phase AC-coupled battery 1200 base units and add more single phase AC-coupled battery 1200 base units as needed, thus allowing the system to function seamlessly. The smallest AC power supply is 3.36 kWh, and since the storage system is modular and an expandable storage product, a user can install as many storage systems as required to power the appliances that a user wants to, with a maximum of twelve single-phase AC-coupled battery 1200 or four three-phase AC-coupled battery 1202.

In at least some embodiments, at least four three-phase AC-coupled batteries 1202 or twelve single-phase AC-coupled 1200 batteries (e.g., adding up to 40 kWh) can be connected to the smart switch 110. Additionally, up to two three-phase AC-coupled batteries 1202 can be daisy chained and connected directly to smart switch 110. For more units, an external sub panel (not shown) may be needed to combine the circuits and connect them to the smart switch 110. In the three-phase AC-coupled battery 1202 with 10.08 kWh usable energy capacity, if one 3.36 kWh base unit fails, the storage system 108 will continue to operate and provide backup power with its remaining base units.

Each single-phase AC-coupled battery 1200 includes four integrated microinverters 1206, LFP battery cells, and a battery management unit (BMU) (not shown). Thus, even if one microinverter fails (the storage system 108 has a DPPM value of less-than-1000), the storage system 108 will continue to operate and provide backup with the remaining microinverters. The faulty microinverter can easily be replaced.

The single-phase AC-coupled battery 1200 can be configured for 3: 3.36 kWh/1.28 kW operation, can weigh about 45.3 kg (100 lbs), and can have dimensions of about 26.1"×14.4"×12.5" (H×L×D). The three-phase AC-coupled battery 1202 can be configured for 10.08 kWh/3.84 kW operation, can weigh about 3×45.3 kg (136 kg, 300 lbs), and can have dimensions of about 26.1"×42.1"×12.5" (H×L×D). The single-phase AC-coupled battery 1200 and three-phase AC-coupled battery 1202 can be AC-coupled with integrated PV micros and can support backup operation and black start (e.g., no power). In at least some embodiments, the single-phase AC-coupled battery 1200 and three-phase AC-coupled battery 1202 can be of the lithium ferrous phosphate (LFP) type, can be configured for passive cooling, can be configured for either indoor and/or outdoor Installations, can be configured for wireless communication (e.g., Zigbee, Wi-Fi, Bluetooth, or the like) and can be configured with modular and expandable power and energy rating.

With the all-AC architecture and LFP chemistry of the storage system 108 of the energy management system 100, the energy management system 108 provides a safe and cost-efficient home energy management system. The microinverters present within the storage system 108 form the grid in a user's house when the utility grid goes down.

The single-phase AC-coupled battery 1200 and each of the three-phase AC-coupled battery 1202 can have an AC input/output of 240 V, and AC max. cont. input/output current of 5.3 A, operating frequency of 60 Hz, output power factor of about −0.85 to about to +0.85, which can be adjustable, AC max. cont. input/output power 1.28 kVA, max. short circuit current 23.2 $A_{rms}$ 3 cycles, single phase 240 V, max. energy output of 3.36 kWh, ambient operating temperature of about −15° C. to about +55° C., and can connect to a dedicated branch circuit up to 20 A.

The passive cooling feature of the storage system eliminates the presence of any moving parts (e.g., mechanical fans, coolants, etc.), thereby making storage system less prone to failures. For example, the passive cooling uses natural convention to cool the single-phase AC-coupled battery 1200 and the three-phase AC-coupled battery 1202.

Some advantages of the single-phase AC-coupled battery 1200 and the three-phase AC-coupled battery 1202 of the energy management system 100 when compared to conventional systems include: a) up to 5.7 kWac photovoltaic (PV) can be paired with one three-phase AC-coupled battery for backup, and additional batteries can be installed if size of the paired PV is more than this value; b) the single-phase AC-coupled battery can be used for PV self-consumption, PV non-export, and other grid-tied applications; c) the single-phase AC-coupled battery can also be used to augment a three-phase AC-coupled battery in a backup system and provide the extra single-phase AC-coupled battery required for pairing with PV beyond the three-phase AC-coupled battery limits; d) each single-phase AC-coupled battery can be used to enable backup with small PV systems of less than 1.9 kWac in size, and more single-phase AC-coupled battery or three-phase AC-coupled battery can be added for larger PV systems sizes; e) up to 1.9 kWac of PV can be supported for backup using each single-phase AC-coupled battery; f) reliability including high reliability PV micros, distributed AC architecture vs single point of failure for string inverters, DC coupled solutions, passive cooling (no moving parts, fans, and pumps with high failure rates), scalability including flexible PV and storage solution for new and retrofit installs; g) 3.36 kWh/1.28 kW increments of battery storage and AC-coupled with ease of expandability in future; h) smartness including simple and easy to design and install and integrated controls, seamless transition to backup, and wireless communications; and i) safety including safety of AC voltage, safety of LFP cells, and safety for battery storage (e.g., UN38.3, UL1973, UL1998, UL991, 9540, 9540A).

Figure 13:
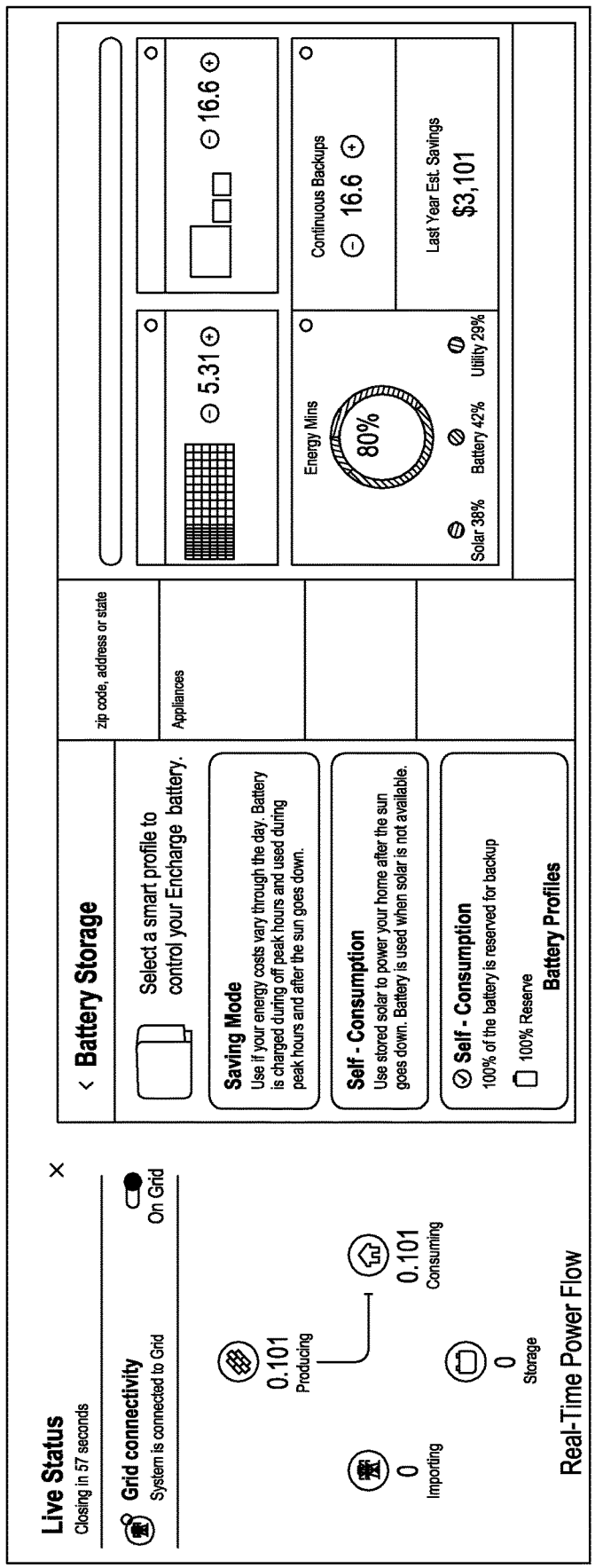
FIG. 13 is a diagram of a screen shoot of a cloud interface for use with the energy management system, in accordance with at least some embodiments of the present disclosure.

FIG. 13 is a diagram of a cloud interface, in accordance with at least some embodiments of the present disclosure. As illustrated by the screen shot 1300, the cloud interface provides real-time power flow with grid connectivity status and control, provides various configurable battery profiles to optimize for various use cases (e.g., self-consumption or time-of-use or backup-only mode), and provides a homeowner system estimator tool for storage+PV sizing.

In at least some embodiments, the energy management system 100 can be provided as a kit. For example, for a grid-agnostic energy management system 100, the kit can include the single-phase AC-coupled battery, the three-phase AC-coupled battery, the smart switch 110, and the wireless communication kit 1102. Additionally, two main breakers for supply side and load side connection of the power supply, and circuit breakers for connection of PV 106 and battery storage systems 110 can be provided.

In addition to the above, the energy management system 100 provides battery storage with backup (Off-grid) capability, e.g., 3.36 kWh and 10.08 kWh products, support backup with seamless transfer (e.g., <100 ms), and provides compatibility with existing PV micro installations (e.g., such as the IQ6 and IQ7 line of PV microinverters both available from Enphase Energy, Inc., from Petaluma, Calif.). For example, the energy management system 100 is configured for PV new installs, PV retrofits, whole house backup operation up to 200 A, sub-panel backup operation up to 200 A, grid-tied operation: TOU, self-consumption, and/or daily cycling, standalone installation without PV.

In at least some embodiments, the energy management system 100 for partial backup can be configured with different utility breaker downgrades. For example, for a 200 A main panel busbar (e.g., 120% capacity it 240 A), a breaker downgrade for a 200 A utility breaker can be calculated using 240 A−200 A=40 A total capacity available for PV and storages and for a breaker downgrade for 150 A utility breaker, then 240 A−150 A=90 A total capacity available for PV and storage. Other calculations can also be used for determining utility breaker downgrades.

In accordance with the present disclosure, the energy management system 100 can be configured for rapid shutdown (e.g., in accordance with the guidelines provided by NEC 201, 690.12 (C)).

While the foregoing is directed to embodiments of the present disclosure, other and further embodiments of the disclosure may be devised without departing from the basic scope thereof, and the scope thereof is determined by the claims that follow.

The invention claimed is:

1. An energy management system comprising:
   a smart switch including an input that is configured to connect to one of a meter at a service entrance or a main load panel;
   a storage system connected to the smart switch; and
   a combiner connected to one of the smart switch or the main load panel and one or more photovoltaics (PVs), wherein the combiner is communicatively connected to the storage system for at least one of sending control signals to the storage system or receiving data comprising status information from the storage system.

2. The energy management system of claim 1, wherein the smart switch is configured to consolidate interconnection equipment into a single enclosure and includes a pre-wired solution including input circuits for at least one of the one or more PVs, the storage system, and a generator configured to connect to the smart switch.

3. The energy management system of claim 1, wherein the energy management system is configured as a kit and includes:
   the smart switch;
   the storage system comprising at least one of a single-phase AC-coupled battery or a three-phase AC-coupled battery; and
   the combiner comprises a wireless communication kit that transmits over a frequency of about 2.4 GHz and 900 MHz.

4. The energy management system of claim 1, wherein the smart switch, storage system, and combiner are connected via an AC power wire, wherein the one or more PVs communicate with the combiner via a power line communication (PLC) over the AC power wire, wherein the storage system, the combiner communicate, and the smart switch communicate with each other via a gateway using a wireless connection.

5. The energy management system of claim 1, wherein the smart switch is configured to connect to a grid at the service entrance, automatically detect grid outages, and transition to backup.

6. The energy management system of claim 1, wherein the smart switch is configured to connect to one or more loads.

7. The energy management system of claim 1, wherein the smart switch comprises centered mounting brackets to support mounting to one or more mounting surfaces.

8. The energy management system of claim 1, wherein the smart switch is configured to support conduit entry from at least one of a bottom, a bottom left side, or bottom right side.

9. The energy management system of claim 1, wherein the smart switch is configured to support one of whole home backup, partial home backup, and subpanel backup, and wherein the smart switch is configured to can provide up to 200 A main breaker support and includes a neutral-forming transformer for split phase 120/240V backup operation.

10. The energy management system of claim 1, wherein the smart switch is configured to manage load imbalance of one or more loads.

11. The energy management system of claim 1, further comprising a second smart switch, wherein each of the smart switch and the second smart switch is configured to connect to corresponding 200 A main load panels, and wherein each of the smart switch and the second smart switch comprise corresponding communication gateways and are configured as independent systems in backup mode.

12. The energy management system of claim 1, wherein the energy management system is configured for 3-phase applications.

13. The energy management system of claim 1, wherein the energy management system is configured for single phase applications.

14. The energy management system of claim 1, further comprising a generator including hardware and software capability.

15. The energy management system of claim 1, wherein the storage system comprises one of at least four three-phase AC-coupled batteries or twelve single-phase AC-coupled batteries that are connected to the smart switch, wherein the four three-phase AC-coupled batteries or twelve single-phase AC-coupled batteries provide up to 40 kWh.

16. The energy management system of claim 1, wherein the storage system comprises two three-phase AC-coupled batteries that are daisy chained to each other and connected to the smart switch.

17. The energy management system of claim 1, wherein the storage system comprises a three-phase AC-coupled battery with 10.08 kWh of usable energy capacity, the three-phase AC-coupled battery comprising three single AC-coupled battery base units each with 3.36 kWh of usable energy capacity, and if one of the single AC-coupled battery base units fails, the storage system is configured to continue to provide backup power with the remaining AC-coupled battery base units.

18. The energy management system of claim 1, wherein the storage system comprises a single-phase AC-coupled battery including four integrated microinverters, lithium ferrous phosphate (LFP) battery cells, and a battery management unit, and wherein if one integrated microinverter of the four integrated microinverters fails the storage system is configured to continue to operate and provide backup with the remaining microinverters.

19. The energy management system of claim 1, wherein the smart switch comprises a plurality of breakers including a main breaker and the smart switch is configured such that the plurality of the breakers need to be opened to de-energize the energy management system, and by opening the main breaker the energy management system is configured to shut down.

20. An energy management system comprising:
   a smart switch including an input that is configured to connect to one of a meter at a service entrance or a main load panel, wherein the smart switch is configured to support one of whole home backup, partial home backup, and subpanel backup;
   a storage system connected to the smart switch, wherein the storage system comprises one of a three-phase AC-coupled battery or a single-phase AC-coupled battery that are connected to the smart switch; and
   a combiner connected to one of the smart switch or the main load panel and one or more photovoltaics (PVs), wherein the combiner is communicatively connected to the storage system for at least one of sending control signals to the storage system or receiving data comprising status information from the storage system.

21. An energy management system comprising:
a smart switch including an input that is configured to connect to one of a meter at a service entrance or a main load panel;
a storage system connected to the smart switch; and
a combiner connected to one of the smart switch or the main load panel and one or more photovoltaics (PVs), wherein the combiner is communicatively connected to the storage system for at least one of sending control signals to the storage system or receiving data comprising status information and performance data from the storage system.

22. An energy management system comprising:
a smart switch including an input that is configured to connect to one of a meter at a service entrance or a main load panel;
a storage system connected to the smart switch; and
a combiner connected to one of the smart switch or the main load panel and one or more photovoltaics (PVs), wherein the combiner is communicatively connected to the storage system for at least one of sending control signals comprising configurable battery profiles for at least one of self-consumption, time-of-use, or mode of operation, to the storage system or receiving data comprising at least one of status information or performance data from the storage system.

* * * * *